United States Patent
Medlock et al.

(10) Patent No.: US 9,562,708 B2
(45) Date of Patent: Feb. 7, 2017

(54) CONDUIT MODULE COUPLED WITH HEATING OR COOLING MODULE

(71) Applicant: WaterFurnace International, Inc., Fort Wayne, IN (US)

(72) Inventors: Charles P. Medlock, Goshen, IN (US); Christopher P. Medlock, Goshen, IN (US); Jonathan A. Brock, Syracuse, IN (US)

(73) Assignee: WATERFURNACE INTERNATIONAL, INC., Fort Wayne, IN (US)

( * ) Notice: Subject to any disclaimer, the term of this patent is extended or adjusted under 35 U.S.C. 154(b) by 494 days.

(21) Appl. No.: 14/094,465

(22) Filed: Dec. 2, 2013

(65) Prior Publication Data

US 2014/0150988 A1 Jun. 5, 2014

Related U.S. Application Data

(60) Provisional application No. 61/732,871, filed on Dec. 3, 2012.

(51) Int. Cl.
| | |
|---|---|
| *F28F 27/00* | (2006.01) |
| *F25B 29/00* | (2006.01) |
| *F25B 25/00* | (2006.01) |
| *F24D 3/10* | (2006.01) |
| *F24D 3/18* | (2006.01) |
| *F24D 19/10* | (2006.01) |

(52) U.S. Cl.
CPC ........... *F25B 29/003* (2013.01); *F24D 3/1058* (2013.01); *F24D 3/18* (2013.01); *F24D 19/1039* (2013.01); *F25B 25/005* (2013.01); *F24D 2200/11* (2013.01); *F25B 2339/047* (2013.01); *Y02B 10/40* (2013.01)

(58) Field of Classification Search
CPC ...... F24D 3/1058; F24D 3/18; F24D 2200/11; F25B 29/005; F25B 25/005; F25B 2339/047
See application file for complete search history.

(56) References Cited

U.S. PATENT DOCUMENTS

| | | | |
|---|---|---|---|
| 4,454,725 A | 6/1984 | Cann | |
| 4,852,362 A | 8/1989 | Conry | |
| 5,070,704 A | 12/1991 | Conry | |
| 5,743,110 A * | 4/1998 | Laude-Bousquet | F25B 1/00 165/218 |
| 5,946,926 A * | 9/1999 | Hartman | F25D 17/02 236/25 A |
| 6,298,677 B1 * | 10/2001 | Bujak, Jr. | F24F 3/06 165/208 |

(Continued)

*Primary Examiner* — Ljiljana Ciric
(74) *Attorney, Agent, or Firm* — Thomas E. Williams; Neal, Gerber & Eisenberg LLP

(57) ABSTRACT

A heating and cooling system for use with hot, cold and source fluid circuits. A conduit module couples a heating/cooling module with the fluid circuits. The conduit module includes four three-way valves to communicated fluid from and to the fluid circuits to first and second heat exchangers in the heating/cooling module. The first heat exchanger is used to heat a fluid flow and the second one chills a second fluid flow. The conduit module simultaneously supplies a hot fluid flow to a hot fluid circuit and a cold fluid to a cold fluid circuit. The source fluid is routed by the conduit module.

12 Claims, 3 Drawing Sheets

(56) References Cited

U.S. PATENT DOCUMENTS

| | | | | |
|---|---|---|---|---|
| 6,467,279 | B1* | 10/2002 | Backman | F25B 5/00 62/113 |
| 7,028,768 | B2* | 4/2006 | Aler | F24F 3/06 165/101 |
| 7,730,935 | B1* | 6/2010 | Bujak, Jr. | F24F 3/06 165/208 |
| 7,832,461 | B2* | 11/2010 | Belady | F25B 41/003 165/80.2 |
| 8,240,165 | B2* | 8/2012 | Novotny | F28D 15/00 165/103 |
| 8,567,487 | B2* | 10/2013 | Christensen | F28F 27/02 165/287 |
| 8,631,666 | B2* | 1/2014 | Hinde | F25B 7/00 62/335 |
| 8,939,196 | B2* | 1/2015 | Morita | F24F 11/008 165/11.1 |
| 9,068,757 | B2* | 6/2015 | Weston | F24D 11/0221 |
| 2008/0053115 | A1* | 3/2008 | Trantham | F24D 19/1015 62/118 |
| 2009/0139255 | A1* | 6/2009 | Hombucher | F24D 11/0214 62/324.4 |
| 2009/0151388 | A1 | 6/2009 | Platt et al. | |
| 2009/0293517 | A1* | 12/2009 | Bittner | F25B 25/005 62/171 |
| 2009/0321041 | A1 | 12/2009 | Hammond | |
| 2010/0031686 | A1 | 2/2010 | Platt | |
| 2010/0065262 | A1 | 3/2010 | Platt | |
| 2010/0108290 | A1 | 5/2010 | Maxwell | |
| 2010/0132390 | A1 | 6/2010 | Platt et al. | |
| 2011/0252821 | A1 | 10/2011 | Miglio | |
| 2011/0272117 | A1* | 11/2011 | Hamstra | F24D 12/02 165/45 |
| 2012/0222441 | A1* | 9/2012 | Sawada | B60H 1/00392 62/238.1 |
| 2012/0279681 | A1* | 11/2012 | Vaughan | F24D 10/003 165/62 |
| 2012/0297811 | A1 | 11/2012 | Miglio | |
| 2012/0315562 | A1* | 12/2012 | Park | H01M 8/0656 429/435 |
| 2013/0008193 | A1 | 1/2013 | Platt | |
| 2013/0008199 | A1 | 1/2013 | Platt et al. | |
| 2014/0102126 | A1* | 4/2014 | Aoun | B60H 1/00899 62/244 |

* cited by examiner

CONDUIT MODULE COUPLED WITH HEATING OR COOLING MODULE

CROSS REFERENCE TO RELATED APPLICATIONS

This application claims priority under 35 U.S.C. 119(e) of U.S. provisional patent application Ser. No. 61/732,871 filed on Dec. 3, 2012 entitled CONDUIT MODULE COUPLED WITH HEATING OR COOLING MODULE the disclosure of which is hereby incorporated herein by reference.

BACKGROUND OF THE INVENTION

1. Field of the Invention

The present invention relates to heating and cooling systems and conveying fluids in such heating and cooling systems.

2. Description of the Related Art

The use of heat pumps and geothermal fluid circuits to provide heating and cooling in a building is known. Improvements in the efficient utilization and simplifications in the fluid flow controls of such heating and cooling systems, however, remain desirable.

SUMMARY OF THE INVENTION

The present invention provides a conduit module that efficiently utilizes the output of a heating/cooling module with a limited number of valves.

The invention comprises, in one form thereof, a conduit module adapted to couple a heating/cooling module having first and second heat exchangers with a hot fluid circuit, a cold fluid circuit and a source fluid circuit. The conduit module includes a hot fluid supply conduit adapted to communicate fluid to the hot fluid circuit and a hot fluid return conduit adapted to receive fluid from the hot fluid circuit; a cold fluid supply conduit adapted to communicate fluid to the cold fluid circuit and a cold fluid return conduit adapted to receive fluid from the cold fluid circuit; and a source fluid supply conduit adapted to communicate fluid to the source fluid circuit and a source fluid return conduit adapted to receive fluid from the source fluid circuit. The conduit module also includes a first inlet conduit adapted to convey fluid from the conduit module to the first heat exchanger and a first outlet conduit adapted to convey fluid from the first heat exchanger to the conduit module wherein the first heat exchanger is adapted to heat the fluid being conveyed by the first inlet and first outlet conduits; and a second inlet conduit adapted to convey fluid from the conduit module to the second heat exchanger and a second outlet conduit adapted to convey fluid from the second heat exchanger to the conduit module wherein the second heat exchanger is adapted to chill the fluid being conveyed by the second inlet and second outlet conduits. The conduit module further includes four three-way valves. A first three-way valve is operably coupled with the hot fluid return conduit, the source fluid return conduit and the first inlet conduit; a second three-way valve operably coupled with the first outlet conduit, the hot fluid supply conduit and the source fluid supply conduit; a third three-way valve operably coupled with the cold fluid return conduit, the source fluid return conduit and the second inlet conduit; and a fourth three-way valve operably coupled with the second outlet conduit, the cold fluid supply conduit and the source fluid supply conduit.

The invention comprises, in another form thereof, a heating and cooling system adapted to be coupled with a hot fluid circuit, a cold fluid circuit and a source fluid circuit. The system includes a heating/cooling module having a first heat exchanger and a second heat exchanger and a conduit module. The conduit module includes a hot fluid supply conduit adapted to communicate fluid to the hot fluid circuit and a hot fluid return conduit adapted to receive fluid from the hot fluid circuit; a cold fluid supply conduit adapted to communicate fluid to the cold fluid circuit and a cold fluid return conduit adapted to receive fluid from the cold fluid circuit; and a source fluid supply conduit adapted to communicate fluid to the source fluid circuit and a source fluid return conduit adapted to receive fluid from the source fluid circuit. The conduit module also includes a first inlet conduit adapted to convey fluid from the conduit module to the first heat exchanger and a first outlet conduit adapted to convey fluid from the first heat exchanger to the conduit module wherein the first heat exchanger is adapted to heat the fluid being conveyed by the first inlet and first outlet conduits; and a second inlet conduit adapted to convey fluid from the conduit module to the second heat exchanger and a second outlet conduit adapted to convey fluid from the second heat exchanger to the conduit module wherein the second heat exchanger is adapted to chill the fluid being conveyed by the second inlet and second outlet conduits. The conduit module further includes four three-way valves. A first three-way valve is operably coupled with the hot fluid return conduit, the source fluid return conduit and the first inlet conduit; a second three-way valve operably coupled with the first outlet conduit, the hot fluid supply conduit and the source fluid supply conduit; a third three-way valve operably coupled with the cold fluid return conduit, the source fluid return conduit and the second inlet conduit; and a fourth three-way valve operably coupled with the second outlet conduit, the cold fluid supply conduit and the source fluid supply conduit.

In some embodiments, the heating/cooling module takes the form of a heat pump having a compressor, an evaporator, an expansion valve and a condenser coupled together to circulate a refrigerant therein in a standard refrigeration cycle and wherein the first heat exchanger defines the condenser and the second heat exchanger defines the evaporator.

The conduit module is advantageously adapted to simultaneously supply heated fluid via the hot fluid supply conduit to the hot fluid circuit and supply chilled fluid via the cold fluid supply conduit to the cold fluid circuit.

Some embodiments, include at least one controller that controls the operation of the first, second, third and fourth valves whereby selective control of the valves defines a plurality of different operating modes. The plurality of operating modes advantageously includes a primary heating with some cooling mode and a primary cooling with some heating mode. The conduit module may be a modular standalone unit installable separate from the heating/cooling unit.

The invention comprises, in another form thereof, a method of circulating fluid to a hot fluid circuit, a cold fluid circuit and a source fluid circuit. The method includes providing a heating/cooling module with a first heat exchanger and a second heat exchanger. The method also includes providing a conduit module with a plurality of three way valves wherein the conduit module is in fluid communication with the hot fluid circuit to communicate a hot fluid supply flow and receive a hot fluid return flow; the conduit module is also in fluid communication with the cold fluid circuit to communicate a cold fluid supply flow and receive a cold fluid return flow; and the conduit module is also in fluid communication with the source fluid circuit to communicate a source fluid supply flow and receive a source fluid return flow. The conduit module is coupled with the heating/cooling module wherein a first fluid flow is directed from the conduit module to the first heat exchanger to heat the first fluid flow and is then directed back to the conduit module and at least a portion of the first fluid flow is then communicated to the hot fluid circuit to define at least a portion of the hot fluid supply flow; and wherein a second fluid flow is directed from the conduit module to the second heat exchanger to chill the second fluid flow and is then directed back to the conduit module and at least a portion of the second fluid flow is then communicated to the cold fluid circuit to define at least a portion of the cold fluid supply flow. Fluid received by the conduit module from the source fluid circuit is at least partially communicated to at least one of the hot fluid and cold fluid circuits to define at least a portion of one of the hot fluid supply flow and the cold fluid supply flow.

In some embodiments of the method, the plurality of three-way valves includes first, second, third and fourth valves, the first valve controllably receiving fluid from the hot fluid return flow and the source fluid return flow and distributing fluid to the first fluid flow; the second valve controllably receiving fluid from the first fluid flow and distributing fluid to the hot fluid supply flow and the source fluid supply flow, the first heat exchanger being operably disposed between the first and second valves; the third valve controllably receiving fluid from the cold fluid return flow and the source fluid return flow and distributing fluid to the second fluid flow; the fourth valve controllably receiving fluid from the second fluid flow and distributing fluid to the cold fluid supply flow and the source fluid supply flow, the second heat exchanger being operably disposed between the third and fourth valves.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
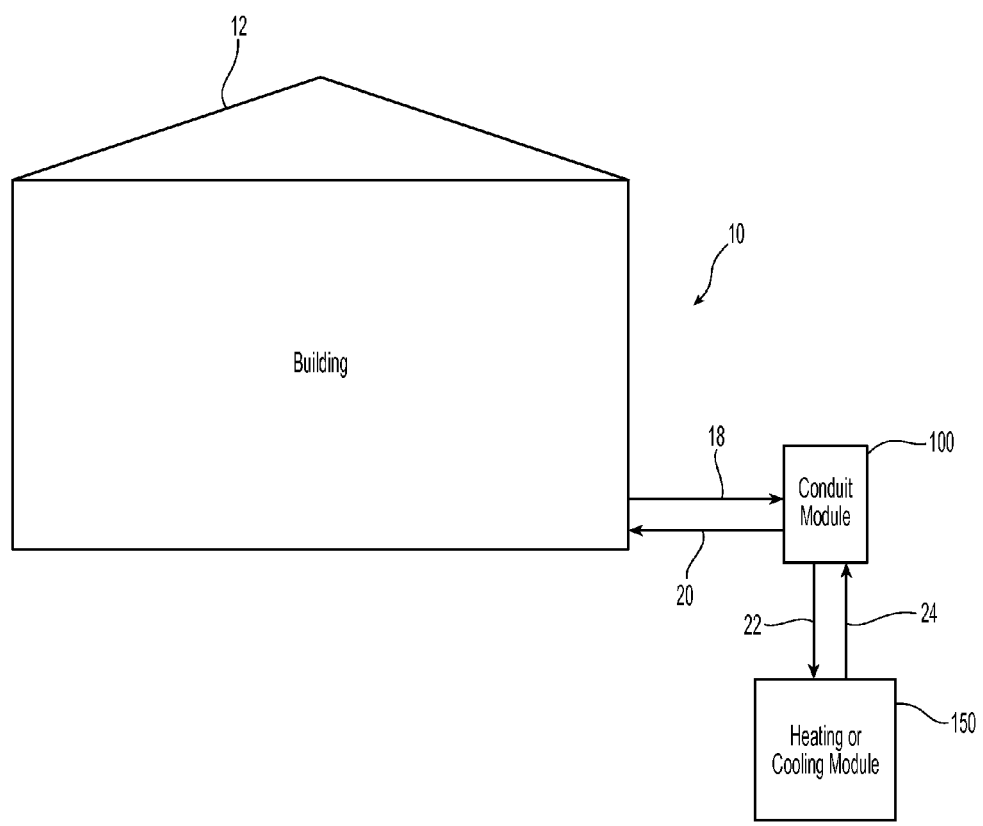
FIG. 1 is a schematic view of a heating and cooling system for a building.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DETAILED DESCRIPTION OF THE INVENTION

A heating and cooling system 10 is schematically depicted in FIG. 1. In this exemplary embodiment, a fluid is distributed to and from a building 12 to provide heating and/or cooling. A conduit module 100 regulates the flow of fluid between building 12 and heating and cooling module 150. Fluid is returned from building 12 to conduit module 100 through return lines 18. Fluid flows from conduit module 100 to heating/cooling module 150 through inlet lines 22 and returns to conduit module 100 through outlet lines 24. The heating/cooling fluid is supplied to building 12 through supply lines 20. The fluid is then used for heating and/or cooling purposes within building 12 or in some alternative application requiring heating and/or cooling.

It is noted that while FIG. 1 illustrates a building 12 as receiving the distributed fluids for heating and/or cooling purposes, it is not necessary for the fluids to be distributed to an enclosed structure nor is it necessary for the fluids to be used for heating or cooling ambient air. For example, the disclosed system will find many applications in industrial settings where heating and/or cooling is needed for industrial processing loads and the heating and cooling loads discussed herein may be either ambient air heating and cooling loads, industrial processing loads or some other type of heating and/or cooling load and these loads may be referred to herein simply as heating or cooling loads.

Figure 2:
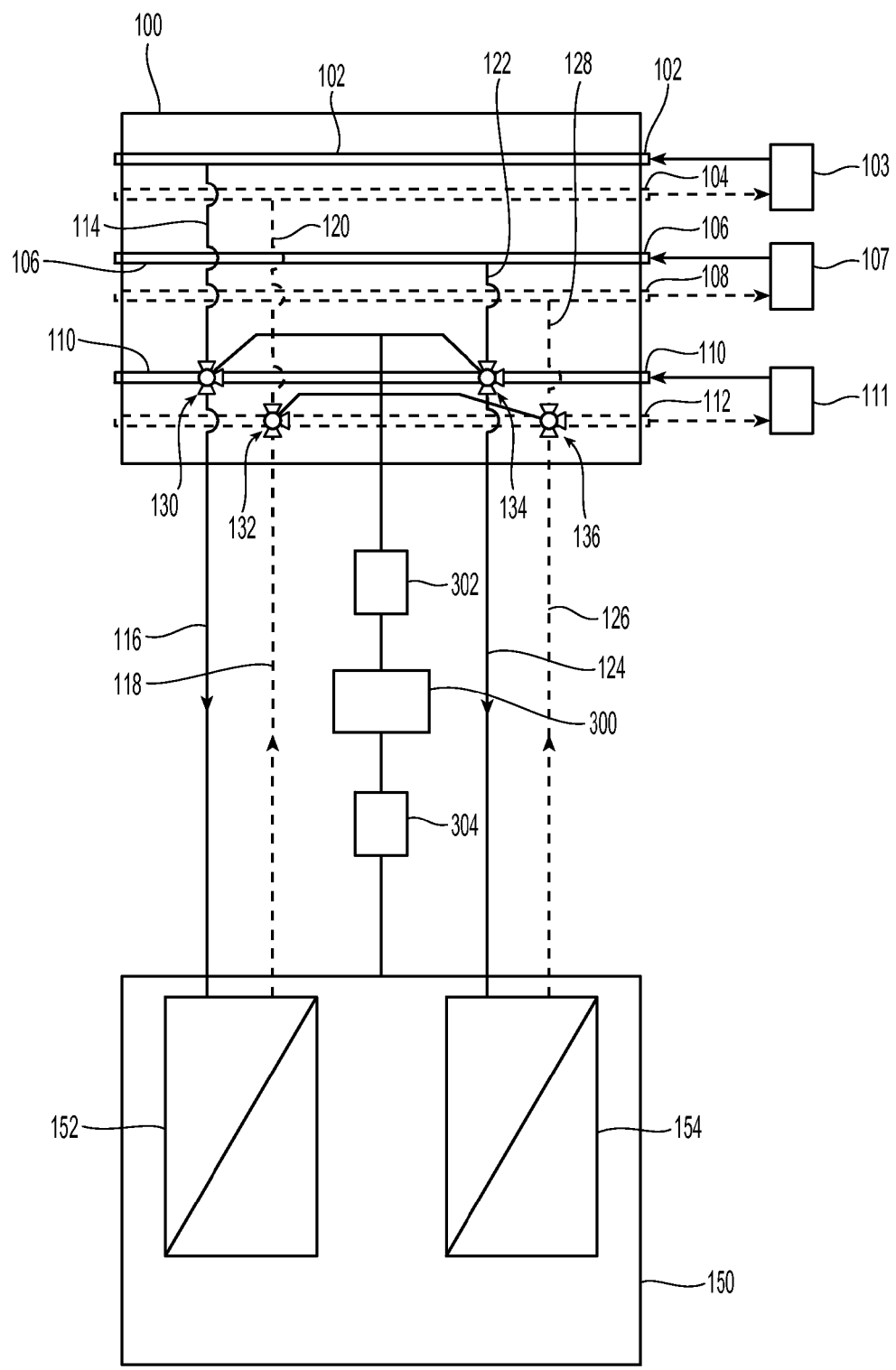
FIG. 2 is a schematic view of a conduit module and heating/cooling module.
Figure 3:
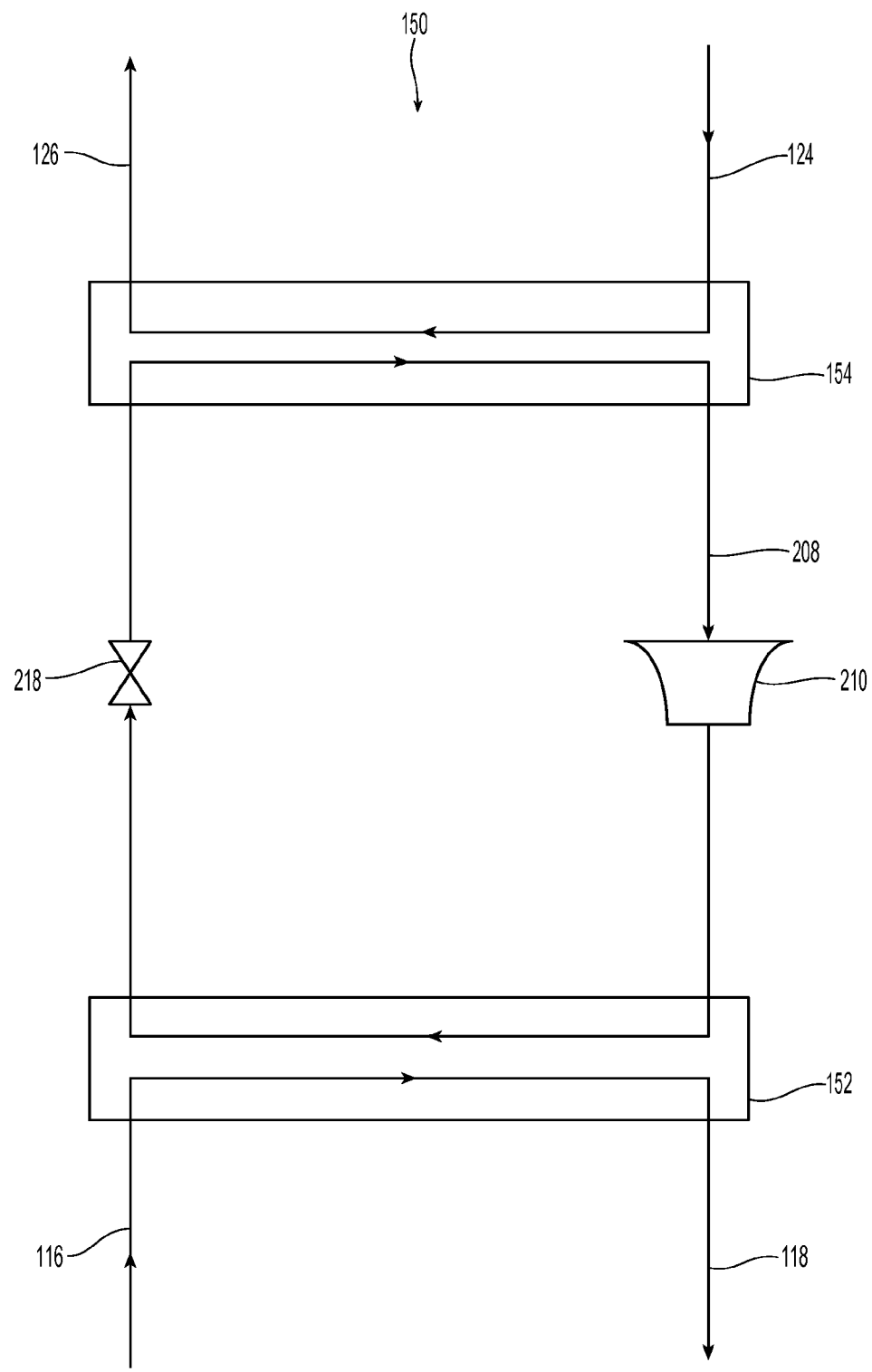
FIG. 3 is a schematic view of a heat/cooling module.

The illustrated conduit module 100 can be used to provide heating, cooling or simultaneous heating and cooling without reversing refrigeration flow direction in heating/cooling module 150. Conduit module 100 can be coupled with a heat pump as depicted in FIGS. 1-3 or can be coupled with a chiller, heat recovery unit, or other suitable heating and/or cooling unit. Conduit module 100 is a standalone unit that can be installed remotely from the heating/cooling module 150. Conduit module 100 may advantageously be a modular standalone unit installable separate from the heating/cooling unit.

FIG. 2 depicts a conduit module 100 and heating/cooling module 150 in greater detail than FIG. 1. Conduit module 100 couples heating/cooling module 150 with a hot fluid circuit 103, a cold fluid circuit 107 and a source fluid circuit 111. Hot fluid circuit 103 circulates hot fluid from conduit module 100 to a building or other location requiring heating via hot fluid supply line 104 and returns the fluid to conduit module 100 via warm fluid return line 102. Cold fluid circuit 107 circulates cold fluid from conduit module 100 to a building or other location requiring cooling via cold fluid supply line 108 and returns the fluid to conduit module 100 via cool fluid return line 106. Source fluid circuit 111 circulates a thermal transfer source fluid to conduit module 100 from a thermal sink or heating/cooling source, such as a geothermal circuit, via inlet line 110 and returns the fluid to the thermal sink or heating/cooling source via outlet line 112. Source fluid circuit 111 may advantageously take the form of a heat sink reservoir such as a geothermal well field, cooling tower, pond, lake or other form of thermal reservoir.

It is noted that the fluid circulated through circuit 111, as well as the other fluid circuits 103, 107, is advantageously a heat transfer fluid such as a propylene glycol and water mixture or other suitable heat transfer fluids. The use of such heat transfer fluids in geothermal loop fields and other thermal reservoir fluid circuits is well known in the art.

Fluid lines 102, 104, 106, 108, 110 and 112 may advantageously take the form of headers thereby facilitating the connection of additional lines in addition to the line connected with conduit module 100. Conduit module 100 may include internal headers which connect with external conduits or rely on external headers. As used herein, the term conduit may also refer to a header and when elements 102, 104, 106, 108, 110 and 112 are referred to herein as conduits or other similar term, these elements and other elements referred to as a conduit or similar term may take the form of a header. It is further noted that return lines 18 of FIG. 1 correspond to fluid lines 102, 106 and 110 of FIG. 2 and that supply lines 20 of FIG. 1 correspond to fluid lines 104, 108 and 112 of FIG. 2.

In the embodiment of FIG. 2, heating/cooling module 150 includes a heat exchanger 152 in the form of a condenser and a heat exchanger 154 in the form of an evaporator. Fluid is conveyed to heat exchanger 152 from conduit module 100 via condenser inlet fluid conduit 116 and is conveyed back to conduit module 100 via condenser outlet fluid conduit 118. Fluid is conveyed to heat exchanger 154 from conduit module 100 via evaporator inlet fluid conduit 124 and is conveyed back to conduit module 100 via evaporator outlet fluid conduit 126. It is noted that inlet lines 22 of FIG. 1 correspond to inlet conduits 116 and 124 in FIG. 2. Similarly, outlet lines 24 of FIG. 1 correspond to outlet conduits 118 and 126 of FIG. 2.

When heating/cooling module 150 is operating, fluid passing through condenser 152 from inlet conduit 116 to outlet conduit 118 will pick up thermal energy. In other words, the fluid in outlet conduit 118 will be hotter than the fluid in inlet conduit 116. Similarly, fluid passing through evaporator 154 from inlet conduit 124 to outlet conduit 126 will be chilled. In other words, fluid in outlet 126 will be at a lower temperature than fluid in inlet 124.

FIG. 3 illustrates one example of a heating/cooling module 150 in greater detail. In this exemplary embodiment, module 150 employs a standard refrigeration cycle. As will be understood by those having ordinary skill in the art, a refrigerant vapor is compressed by compressor 210 which increases both the pressure and temperature of the refrigerant. The high pressure and temperature refrigerant is then conveyed through condenser 152 where thermal energy is transferred from the refrigerant to the fluid being conveyed from inlet conduit 116 to outlet conduit 118. The refrigerant is converted from a vapor to a liquid in condenser 152 by the transfer of thermal energy. As can be seen in FIG. 3, condenser 152 may use a counter-flow configuration to enhance the transfer of thermal energy from the refrigerant to the fluid discharged through outlet conduit 118.

The refrigerant flows from condenser 152 through expansion valve 218 which reduces the pressure of the refrigerant resulting a liquid vapor mixture. The refrigerant is fully converted back into a vapor in evaporator 154 whereby the fluid being conveyed from inlet conduit 124 to outlet conduit 126 is cooled. Refrigerant line 208 conveys the refrigerant vapor from evaporator 154 to compressor 210 and the cycle is repeated. As can be seen in FIG. 3, evaporator 154 may use a counter-flow configuration to enhance the transfer of thermal energy between the fluid entering through inlet conduit 124 and the refrigerant.

It is noted that heating/cooling module 150 is a heat pump as that term is used herein. More specifically, the term heat pump is used herein to refer to a system having two heat exchangers and employing a standard refrigeration cycle. In this regard, it is further noted that some market segments employ the term heat pump only when referencing a system having a reversing valve that allows each of two heat exchangers to operate selectively as an evaporator or condenser and uses the term chiller or heat recovering chiller to refer to systems which have a dedicated evaporator and a dedicated condenser. The term heat pump as used herein refers to both types of systems, i.e., systems with a reversing valve and those without, and both types of systems, and other systems which generate heated and/or chilled fluid, can be used with the conduit module 100 described herein.

Conduit module 100 couples heating/cooling module 150 with a hot fluid circuit 103, a cold fluid circuit 107 and a source fluid circuit 111 and valves 130, 132, 134, 136 control the distribution of hot and cold fluid streams. In the illustrated embodiment, valves 130, 132, 134, 136 are all three-way valves having a conventional structure.

As will be recognized by those having ordinary skill in the art, the operation of valves 130, 132, 134, 136 as well as the operation of module 150 can be controlled by electronic controllers. For example, a unitary controller 302 can be used to control the operation of conduit module 100, its valves 130, 132, 134, 136 and its associated components, another unitary controller 304 can be used to control the operation of heating/cooling module 150 and its associated refrigeration cycle and safeties with a supervisory controller 300 managing the integration of the two module along with other associated modules in the overall system.

Turning now to the hot fluid circuit, first valve 130 receives fluid flow from conduit 114 which returns fluid to module 100 from hot fluid circuit 103. Valve 130 also receives fluid from source fluid circuit 111 from conduit 110. Fluid entering valve 130 is conveyed to condenser inlet conduit 116 which conveys the fluid to condenser 152 where it is heated. Hot fluid from condenser 152 is conveyed to second valve 132 by condenser outlet conduit 118. Second valve 132 controllably distributes the hot fluid to conduit 120 which conveys fluid to hot fluid circuit 103 and conduit 112 which conveys fluid to source fluid circuit 111. Valves 130, 132 are used to control the distribution of fluid flow among these circuits.

Turning next to the cold fluid circuit, third valve 134 receives fluid flow from conduit 122 which returns fluid to module 100 from cold fluid circuit 107. Valve 134 also receives fluid from source fluid circuit 111 from conduit 110. Fluid entering valve 134 is conveyed to evaporator inlet conduit 124 which conveys the fluid to evaporator 154 where it is cooled. Cold fluid from evaporator 154 is conveyed to fourth valve 136 by evaporator outlet conduit 126. Fourth valve 136 controllably distributes the cold fluid to conduit 128 which conveys fluid to cold fluid circuit 107 and conduit 112 which conveys fluid to source fluid circuit 111. Valves 134, 136 are used to control the distribution of fluid flow among these circuits.

The use of three-way valves 130, 132, 134, 136 not only provides a conduit module with simplified valving, piping and control, it also provides enhanced flexibility in fluid distribution thereby facilitating energy efficient utilization of heating/cooling module 150 and source fluid circuit 111. Oftentimes, heat pumps such as the illustrated heating/cooling module 150 are used for both heating and cooling purposes but only for one of those purposes at any one time. Conduit module 100 allows heating/cooling module 150 to be used for both heating and cooling purposes simultaneously. In other words, it allows for utilizing the energy from both the evaporator and the condenser instead of just one or the other.

One difficulty in utilizing the energy from both the evaporator and the condenser of a heat pump is that the heating and cooling loads which are being addressed are rarely balanced. In other words, the heat pump must be operated to meet the greater demand, either heating or cooling, and there will be an excess capacity for the other load. The illustrated conduit module allows for the heat pump to efficiently and precisely meet both demands even when the heating and cooling loads are unbalanced. This is accomplished by using valves 130, 132, 134, 136 to proportion the fluid flow to simultaneously meet both demands and thereby provide optimal utilization and the energy efficient management of heating/cooling module 150.

Conduit module 100 and associated heating/cooling module 150 define several different modes of operation to provide heating and cooling capacities to a building. Such modes include a heating mode, a cooling mode, simultaneous heating and cooling, primary heating with some cooling and primary cooling with some heating.

In one mode or arrangement, fluid entering warm fluid header 102 is conveyed to conduit 114 and then to valve 130. The fluid is discharged from valve 130 into conduit 116 which conveys the fluid to heat exchanger 152 in module 150 where the fluid is heated. The hot fluid is then conveyed from heat exchanger 152 to valve 132 by conduit 118. The hot fluid then enters conduit 120 which conveys it to hot fluid header 104 where it can be used in hot fluid circuit 103. In this heating mode arrangement all of the hot fluid is conveyed to hot fluid header 104 for use in hot fluid circuit 103.

If there is no cooling demand, heat will still need to be transferred within evaporator 154 for the proper operation of heating/cooling module 150. This can be accomplished by using a fan to blow air across evaporator 154 or by circulating source fluid from circuit 111 through evaporator 154. More specifically, fluid may be conveyed from header 110 through valve 134, and conduit 124 to evaporator 154. The fluid is then conveyed from evaporator 154 by conduit 126 to valve 136 where it is discharged to header 112 and returns to source fluid circuit 111, for example, a geothermal heat sink.

In another arrangement or mode of operation for conduit module 100 and heating/cooling module 150, fluid from cool fluid header 106 is conveyed through conduit 122 to valve 134. Valve 134 routes the fluid to conduit 124 which conveys it to heat exchanger 154 where the fluid is chilled. The now cold fluid is conveyed by conduit 126 out of module 150 to valve 136. Valve 136 then routes the fluid to cold fluid header 108 whereby it can be utilized in cold fluid circuit 107. In this cooling mode arrangement all of the cold fluid is conveyed to cold fluid header 108 for use in cold fluid circuit 107.

If there is no heating demand, heat will still need to be transferred within condenser 152 for the proper operation of heating/cooling module 150. This can be accomplished by using a fan to blow air across condenser 152 or by circulating source fluid from circuit 111 through condenser 152. More specifically, fluid may be conveyed from header 110 through valve 130, and conduit 116 to condenser 152. The fluid is then conveyed from evaporator 152 by conduit 118 to valve 132 where it is discharged to header 112 and returns to source fluid circuit 111, for example, a geothermal heat sink.

There may be situations where source fluid circuit 111 can be used to provide free stage heating or cooling wherein the source fluid can be circulated for either heating or cooling purposes without operating heating/cooling module 150.

For example, if the fluid entering source fluid header 110 is sufficiently cold to address the cooling demands of cold fluid circuit 107, fluid from header 110 can be conveyed to conduit 124 through valve 134. It can pass through evaporator 154 and then to conduit 124. Because module 150 is not operating, there will be no transfer of thermal energy with the fluid as it passes through evaporator 154. Conduit 126 will then transfer the fluid to valve 136 which will direct it to conduit 128 and cold fluid header 108 thereby allowing it be utilized in cold fluid circuit 107.

Similarly, when the fluid entering source fluid header 110 is sufficiently warm to address the heating demands of hot fluid circuit 103, fluid from header 110 can be conveyed to conduit 116 through valve 130. The fluid will then pass through condenser 152 and on to conduit 118. Because module 150 is not operating, there will be no transfer of thermal energy with the fluid as it passes through condenser 152. Conduit 118 will then transfer the fluid to valve 132 which will direct it to conduit 120 and hot fluid header 104 thereby allowing it be utilized in hot fluid circuit 103.

Fluid from source fluid circuit 111 can also be used to reduce the load on heating/cooling module 150. As mentioned above, source fluid circuit 111 may take the form of a heat sink reservoir such as a geothermal well field, cooling tower, pond, lake or other form of thermal reservoir. For example, fluid from a geothermal circuit can be admixed or blended with a colder fluid stream to increase the temperature of the fluid stream before heating the blended fluid stream to thereby increase the overall efficiency of the unit and decrease the work and lift of the refrigeration cycle. For example, when heating is required and the fluid entering conduit module 100 from the source fluid circuit 111 is warmer than the fluid returned to the conduit module from hot fluid circuit 103, the fluid that is directed to heat exchanger 152 by valve 130 advantageously includes fluid from source fluid circuit 111 and may be either all fluid from source fluid return conduit 110 or a combination of fluid from source fluid return conduit 110 and fluid from hot fluid circuit return conduit 102.

Similarly, fluid from source fluid circuit 111 can be used when cooling is required. For example, when fluid from circuit 111 is cooler than the fluid being returned to conduit module 100 from cold fluid circuit 107, the fluid that is directed to heat exchanger 154 by valve 134 advantageously includes fluid from source fluid circuit 111 and may be either all fluid from source fluid return conduit 110 or a combination of fluid from source fluid return conduit 110 and fluid from cold fluid circuit return conduit 106.

It is noted that to provide a combined discharge three-way valves 130, 134, which each have two inlets and one outlet, may be operated by simultaneously allowing some incoming flow from both of the inlets and discharging the combined fluid to the outlet, or, by periodically switching from one inlet to the other to thereby provide for a combined flow discharge. Similarly, to separate an inflow into two outflows, three-way valves 132, 136, which each have one inlet and two outlets, may be operated by allowing the incoming flow to be divided by simultaneously discharging fluid through the two outlets, or, by periodically switching the entire outflow from one outlet to the other outlet.

As mentioned above, when both heating and cooling are required, the heating and cooling demands may be unbalanced. In such a situation, the source fluid circuit can be used as described above to efficiently meet the greater demand, for example, by combining fluid from the source fluid circuit 111 with fluid being returned from the hot fluid circuit when the greater demand is a heating demand, and not using the source fluid circuit to increase the efficiency of the other demand. The relative proportions of the source fluid and return fluid can be adjusted to account for the specific demands being placed on the system.

In some instances, the secondary or lesser demand side of the system may still have excess capacity after using the source fluid circuit to enhance the efficiency of the greater demand side. In such situation, the source fluid circuit can be used to absorb the excess capacity of the lesser demand side. For example, if cooling demand is the primary or greater demand and the fluid returned to conduit module 100 from the cold fluid circuit 107 is warmer than the fluid returned to the conduit module 100 from the source fluid circuit 111, fluid from circuit 111 may be used to increase the efficiency of module 150 in meeting the cooling demands of the system by blending fluid from both source fluid return conduit 110 and cold circuit return conduit 106 before chilling the combined fluid stream in heat exchanger 154 and then supplying the chilled fluid to cold fluid circuit 107. To absorb the excess heat capacity of heat exchanger 152, fluid from source fluid return conduit 110 may be used alone or in combination with fluid from hot fluid return conduit 104 to absorb heat from heat exchanger 152. Alternatively, or additionally, the hot fluid flowing from heat exchanger 152 to valve 132 may be partially distributed to source fluid circuit 111 to thereby absorb some of the excess heat capacity.

Such measures may also be used without combining return flow from the source fluid circuit with the return flow from the primary demand side of the system. For example, if the primary demand is a heating demand, fluid from the hot fluid return conduit 102 may be routed to heat exchanger 152 by valve 130 where it is heated and then returned to hot fluid circuit 103 by valve 132 without any fluid being interchanged with source fluid circuit 111. On the other side of the system, if the fluid returning from cold fluid circuit 107 is colder than the fluid returning from source fluid circuit 111, valve 134 may combine fluid from the cold fluid return conduit 106 with fluid from source fluid return conduit 110 and then direct the combined flow to heat exchanger 154 which chills the combined flow. Some or all of the chilled flow from heat exchanger 154 can then be routed to cold fluid circuit 107 by valve 136.

The use of valves 130, 132, 134 and 136 to selectively distribute fluid flow between fluid circuits 103, 107, 111 may employed in various other modes as well as those explicitly discussed herein as will be recognized by those having ordinary skill in the art. Moreover, if module 150 is provided with a reversing valve, even further flexibility in the operation of the system can be obtained. However, one advantage of module 100 is that it provides great flexibility in the operation of the system without the use of a reversing valve in module 150.

The use of three-way valves 130, 132, 134, 136 provides a highly versatile conduit module with a limited number of valves and associated piping. As mentioned above, the conduit module 100 may also be advantageously configured as a modular standalone unit installable separate from the heating/cooling unit. For example, valves 130, 132, 134, 136 and their associated piping could be mounted on a frame together with controller 302. This module could then be positioned proximate a heating/cooling module and piping interconnections made between conduit module 100 and module 150 and fluid circuits 103, 107 and 111. Such a module structure facilitates installation and maintenance and allows conduit module 100 to be more readily installed in a preexisting system already having a heating/cooling module 150 and fluid circuits 103, 107 and 111.

While this invention has been described as having an exemplary design, the present invention may be further modified within the spirit and scope of this disclosure. This application is therefore intended to cover any variations, uses, or adaptations of the invention using its general principles.

What is claimed is:

1. A conduit module adapted to couple a heating/cooling module having first and second heat exchangers with a hot fluid circuit, a cold fluid circuit and a source fluid circuit; the conduit module comprising:

a hot fluid supply conduit adapted to communicate fluid to the hot fluid circuit and a hot fluid return conduit adapted to receive fluid from the hot fluid circuit;

a cold fluid supply conduit adapted to communicate fluid to the cold fluid circuit and a cold fluid return conduit adapted to receive fluid from the cold fluid circuit;

a source fluid supply conduit adapted to communicate fluid to the source fluid circuit and a source fluid return conduit adapted to receive fluid from the source fluid circuit;

a first inlet conduit adapted to convey fluid from the conduit module to the first heat exchanger and a first outlet conduit adapted to convey fluid from the first heat exchanger to the conduit module, the first heat exchanger being adapted to heat any fluid being conveyed by the first inlet and first outlet conduits;

a second inlet conduit adapted to convey fluid from the conduit module to the second heat exchanger and a second outlet conduit adapted to convey fluid from the second heat exchanger to the conduit module, the second heat exchanger being adapted to chill any fluid being conveyed by the second inlet and second outlet conduits;

a first three-way valve operably coupled with the hot fluid return conduit, the source fluid return conduit and the first inlet conduit;

a second three-way valve operably coupled with the first outlet conduit, the hot fluid supply conduit and the source fluid supply conduit;

a third three-way valve operably coupled with the cold fluid return conduit, the source fluid return conduit and the second inlet conduit;

and a fourth three-way valve operably coupled with the second outlet conduit, the cold fluid supply conduit and the source fluid supply conduit.

2. The conduit module of claim 1 wherein the conduit module is adapted to be coupled with a heating/cooling module comprising a heat pump.

3. The conduit module of claim 1 further comprising at least one controller that controls the operation of the first, second, third and fourth valves whereby selective control of the valves defines a plurality of different operating modes.

4. The conduit module of claim 3 wherein the conduit module is adapted to simultaneously supply heated fluid via the hot fluid supply conduit to the hot fluid circuit and supply chilled fluid via the cold fluid supply conduit to the cold fluid circuit.

5. The conduit module of claim 4 wherein the plurality of operating modes includes a primary heating with some cooling mode and a primary cooling with some heating mode.

6. The conduit module of claim 1 wherein the conduit module is a modular stand-alone unit installable separately from the heating/cooling module.

7. A heating and cooling system adapted to be coupled with a hot fluid circuit, a cold fluid circuit and a source fluid circuit; the system comprising:

a heating/cooling module having a first heat exchanger and a second heat exchanger; and a conduit module, the conduit module comprising:

a hot fluid supply conduit adapted to communicate fluid to the hot fluid circuit and a hot fluid return conduit adapted to receive fluid from the hot fluid circuit;

a cold fluid supply conduit adapted to communicate fluid to the cold fluid circuit and a cold fluid return conduit adapted to receive fluid from the cold fluid circuit;

a source fluid supply conduit adapted to communicate fluid to the source fluid circuit and a source fluid return conduit adapted to receive fluid from the source fluid circuit;

a first inlet conduit adapted to convey fluid from the conduit module to the first heat exchanger and a first outlet conduit adapted to convey fluid from the first heat exchanger to the conduit module, the first heat exchanger being adapted to heat any fluid being conveyed by the first inlet and first outlet conduits;

a second inlet conduit adapted to convey fluid from the conduit module to the second heat exchanger and a second outlet conduit adapted to convey fluid from the second heat exchanger to the conduit module, the second heat exchanger being adapted to chill any fluid being conveyed by the second inlet and second outlet conduits;

a first three-way valve operably coupled with the hot fluid return conduit, the source fluid return conduit and the first inlet conduit;

a second three-way valve operably coupled with the first outlet conduit, the hot fluid supply conduit and the source fluid supply conduit;

a third three-way valve operably coupled with the cold fluid return conduit, the source fluid return conduit and the second inlet conduit;

and a fourth three-way valve operably coupled with the second outlet conduit, the cold fluid supply conduit and the source fluid supply conduit.

8. The system of claim 7 wherein the heating/cooling module comprises a heat pump having a compressor, an evaporator, an expansion valve and a condenser coupled together to circulate a refrigerant therein in a standard refrigeration cycle and wherein the first heat exchanger defines the condenser and the second heat exchanger defines the evaporator.

9. The system of claim 8 further comprising at least one controller that controls the operation of the first, second, third and fourth valves whereby selective control of the valves defines a plurality of different operating modes.

10. The system of claim 9 wherein the conduit module is adapted to simultaneously supply heated fluid via the hot fluid supply conduit to the hot fluid circuit and supply chilled fluid via the cold fluid supply conduit to the cold fluid circuit.

11. The system of claim 10 wherein the plurality of operating modes includes a primary heating with some cooling mode and a primary cooling with some heating mode.

12. The system of claim 7 wherein the conduit module is a modular stand-alone unit installable separately from the heating/cooling module.

* * * * *